(12) United States Patent
Wilcox

(10) Patent No.: US 12,399,283 B2
(45) Date of Patent: Aug. 26, 2025

(54) METHODS AND APPARATUS TO MANAGE CORRECTION REQUESTS IN A POSITIONING SYSTEM

(71) Applicant: Deere & Company, Moline, IL (US)

(72) Inventor: Timothy A. Wilcox, Cissna Park, IL (US)

(73) Assignee: Deere & Company, Moline, IL (US)

( * ) Notice: Subject to any disclaimer, the term of this patent is extended or adjusted under 35 U.S.C. 154(b) by 318 days.

(21) Appl. No.: 17/901,666

(22) Filed: Sep. 1, 2022

(65) Prior Publication Data
US 2023/0147323 A1    May 11, 2023

Related U.S. Application Data

(60) Provisional application No. 63/276,344, filed on Nov. 5, 2021.

(51) Int. Cl.
| | | |
|---|---|---|
| *G01S 19/48* | (2010.01) | |
| *G01S 19/07* | (2010.01) | |
| G01S 19/04 | (2010.01) | |
| G01S 19/39 | (2010.01) | |
| G01S 19/40 | (2010.01) | |

(52) U.S. Cl.
CPC .............. *G01S 19/48* (2013.01); *G01S 19/07* (2013.01); *G01S 19/04* (2013.01); *G01S 19/071* (2019.08); *G01S 19/396* (2019.08); *G01S 19/40* (2013.01)

(58) Field of Classification Search
CPC .......... G01S 19/48; G01S 19/07; G01S 19/04; G01S 19/396; G01S 19/071; G01S 19/40
See application file for complete search history.

(56) References Cited

U.S. PATENT DOCUMENTS

| | | |
|---|---|---|
| 7,562,167 B2 | 7/2009 | Anderson |
| 7,679,555 B2 | 3/2010 | Dai et al. |
| 8,587,475 B2 | 11/2013 | Leandro |
| 9,426,230 B2 | 8/2016 | Anderson |
| 10,234,565 B2 | 3/2019 | Wilson et al. |

(Continued)

FOREIGN PATENT DOCUMENTS

| | | | |
|---|---|---|---|
| AU | 2005278069 | 8/2010 | |
| CN | 107710017 A | * 2/2018 | ........... G01S 19/426 |

(Continued)

OTHER PUBLICATIONS

Digifarm, "Digifarm VBN," retrieved from [https//www.digifarm.com/faqs/] on Dec. 7, 2019, 1 page.

*Primary Examiner* — Vladimir Magloire
*Assistant Examiner* — Ismaaeel A. Siddiquee
(74) *Attorney, Agent, or Firm* — HANLEY, FLIGHT & ZIMMERMAN, LLC

(57) ABSTRACT

Methods, apparatus, systems and articles of manufacture are disclosed to manage correction requests in a positioning system. Example apparatus disclosed herein includes accuracy determination circuitry to determine accuracy of a current position based on location data. The example apparatus includes correction request circuitry to request location correction data from a reference location when the accuracy does not satisfy a threshold. The example apparatus includes correction determination circuitry to adjust the location data with location correction data.

17 Claims, 8 Drawing Sheets

(56) References Cited

U.S. PATENT DOCUMENTS

| | | | | |
|---|---|---|---|---|
| 2006/0046749 A1* | 3/2006 | Pomerantz | ............ | H04W 64/00 |
| | | | | 455/457 |
| 2009/0135057 A1* | 5/2009 | Vollath | .................... | G01S 19/32 |
| | | | | 342/357.27 |
| 2015/0045058 A1* | 2/2015 | Rudow | ............. | H04M 1/72457 |
| | | | | 455/456.1 |
| 2022/0357464 A1* | 11/2022 | Peng | ..................... | G01S 19/396 |

FOREIGN PATENT DOCUMENTS

| EP | 1989567 | 8/2012 |
|---|---|---|
| EP | 2044457 | 12/2015 |
| EP | 2364454 | 2/2019 |

\* cited by examiner

US 12,399,283 B2

METHODS AND APPARATUS TO MANAGE CORRECTION REQUESTS IN A POSITIONING SYSTEM

RELATED APPLICATION

This patent claims the benefit of U.S. Provisional Patent Application No. 63/276,344, which was filed on Nov. 5, 2021. U.S. Provisional Patent Application No. 63/276,344 is hereby incorporated herein by reference in its entirety. Priority to U.S. Provisional Patent Application No. 63/276,344 is hereby claimed.

FIELD OF THE DISCLOSURE

This disclosure relates generally to global navigation satellite systems, and, more particularly, methods and apparatus to manage correction requests in a positioning system.

BACKGROUND

Real-time kinematic (RTK) positioning techniques are commonly used for improving position data from satellites that are used in global navigation satellite systems (GNSS). Global navigation satellite systems derive position data based on calculating distances between a receiver and different satellites from time measurements of signal transmissions from the respective satellites to the receiver. In global navigation satellite systems, the location of the receiver is calculated based on comparing the distances from the different satellites. RTK positioning techniques determine corrections for the position data from the satellites by calculating errors metrics based on a reference location.

DETAILED DESCRIPTION

Figure 1:
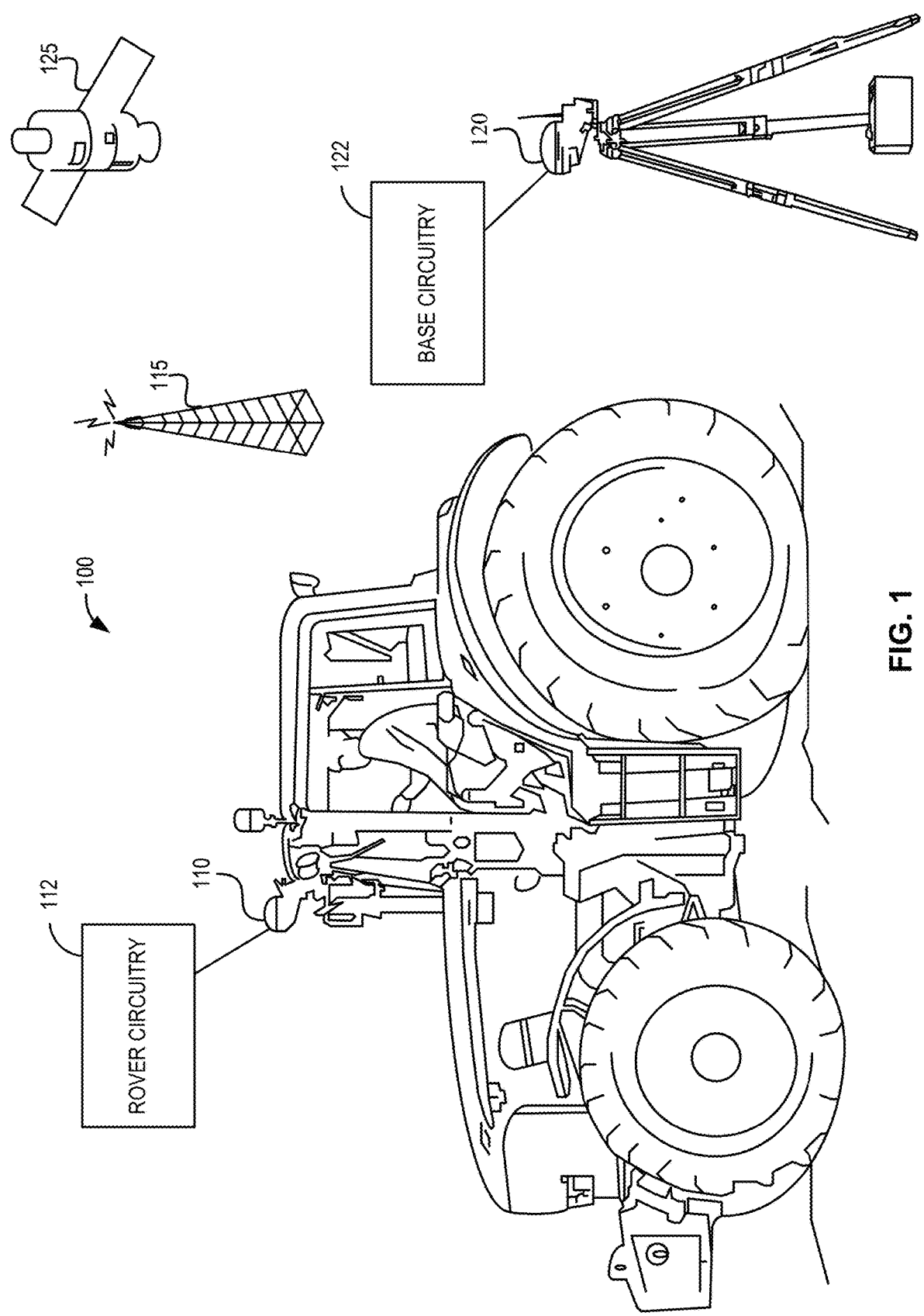
FIG. 1 is a schematic illustration of an example environment in which teaching of this disclosure may be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

Global navigation satellite systems (e.g., global positioning system (GPS), etc.) derive position data based on a receiver obtaining signals from a network of satellites. Global navigation satellite systems determine distances between the receiver and different satellites based on how long it takes for the receiver to receive signals from the respective satellites. In global navigation satellite systems, the location of the receiver is calculated based on comparing the distances from the different satellites. However, the location data determined by the global navigation satellite systems can grow increasing inaccurate based on signal processing delays, satellite clock errors, etc.

Real-time kinematic (RTK) positioning is a technique commonly used for improving position data from satellites that are used in the global navigation satellite systems. The RTK positioning technique derives corrections for satellite-based positioning based on a known location of a reference station (e.g., a base). RTK positioning systems calculate corrections for respective satellites in the network by comparing the known location of the base to the location determined from the satellite-based calculations. The RTK corrections are broadcasted from the base to the GPS receivers (e.g., rovers).

As the number of satellites increase in the constellation, RTK corrections for the growing number of satellites need to be broadcast between the base and a rover. An increase in the RTK corrections will require more data to be sent between base circuitry implemented at the base and rover circuitry implemented at the rover. In prior systems, RTK corrections were broadcasted from the base to rovers using radio modems. However, performance of GPS receivers have increased, allowing them to navigate further from an RTK base (conceivably up to 50 miles), which is well beyond the capabilities of currently utilized radios.

In some examples, agricultural machines (e.g., tractors, etc.) use GPS systems to improve precision of farming activities (e.g., field mapping, farm planning, tractor guidance, soil sampling, etc.). In such examples, the agricultural machines include cellular modems for their GPS systems. In some examples, RTK corrections are delivered to the GPS receiver using the cellular modem. When the GPS is navigating using RTK, data is sent from the base circuitry to the rover circuitry at a constant frequency. In some examples, cellular products typically establish a continuous connection to either a virtual base station provider or directly to a data stream coming from a base. For agricultural uses, this communication typically consumes about 1 GB of data per month for each GPS.

In some examples, GPS receivers are able to determine network corrections for positioning data without the use of RTK corrections. The GPS receivers can connect to a GPS correction network that provides corrections for positioning data to the GPS receivers that are included in the network. In some examples, the information of the GPS receivers are collected and monitored by the GPS correction network. In some examples, the GPS correction network generate corrections for all satellites in constellation of satellites for the GPS systems. The GPS receivers connect to a correction stream from the GPS correction network to receive the corrections. Unlike the RTK corrections that are specific to GPS receivers in specific geographic locations, the corrections from the GPS correction network are relevant to the whole constellation of satellites and are not specific to the GPS receivers in specific geographic locations. GPS receivers are able to attain performance in the X-Y-Z planes that is acceptable in performance and indistinguishable to the performance of RTK based navigation using the corrections from the GPS correction network. In some examples, GPS receivers are able to determine and monitor the accuracy of the GPS solutions from the GPS correction network.

Examples disclosed herein serve to control the amount of corrections sent to a GPS rover by using a set of criteria such as an acceptable error metric to only request RTK corrections from a base when they are needed. Examples disclosed herein obtain information that characterizes the accuracy or error of the GPS network corrections. Examples disclosed herein use this information to determine when communication with the base is necessary. Examples disclosed herein can request corrections continuously at startup to rapidly pull in an accurate position but then rely on a GPS network and/or other network based corrections to the largest extent possible until certain criteria are met (such as a configurable error metric is reached). In examples disclosed herein, the GPS requests the communications device (e.g., a user's cellular phone or integrated modem) to connect to the RTK correction stream and receive data until the error metric is reduced. In some examples, the amount of acceptable error could be application specific (e.g., guidance vs elevation control) or it could be based on the type of field operation that is being done (e.g., planting, tillage, etc.), or user configurable. In some examples, the communication device connects to the RTK correction stream when environmental conditions affect the error metric of the GPS. For example, if the machine containing the GPS drives under a tree, the GPS may lose communication with the satellite and/or the GPS correction network, which can cause an increase in the error of the location determined by the GPS. In such examples, the communication device connects to the RTK correction stream. In such examples, the communication device establishes a connection with the RTK correction stream to improve the accuracy of the position once the machine containing the GPS is no longer under the tree, and the communication device maintains the connection with the RTK correction stream until the error metric is reduced. In examples disclosed herein, the GPS monitors the inaccuracy of the solution and requests corrections only when it needs them, thus significantly reducing the amount of data that is required to navigate but insuring a minimum level of accuracy.

FIG. 1 is a schematic illustration of an example environment 100 in which teaching of this disclosure may be implemented. The example environment includes an example rover 110 implementing example rover circuitry 112, an example cell tower 115, an example base 120 implementing example base circuitry 122, and an example satellite 125.

The example rover circuitry 112 of the illustrated example of FIG. 1 determines current location data for a device associated with the rover circuitry 112 using the example satellite 125. The rover circuitry 112 receives signals from the satellite 125. The rover circuitry 112 determines the amount of time it took for the rover circuitry 112 to receive the signal from the satellite 125. The rover circuitry 112 determines the current location data based on a calculated distance from the satellite 125 using the amount of time to receive the signal. In some examples, the rover circuitry 112 determines the accuracy of the current location data by calculating an error metric for the current location data. In some examples, the rover circuitry 112 compares the accuracy of the current location data to a threshold. In some examples, if the rover circuitry 112 determines the accuracy of the current location data does not satisfy the threshold, then the rover circuitry 112 connects to a correction stream to obtain location correction data from the example base circuitry 122. An example implementation of the rover circuitry 112 is further described in detail below in connection with FIG. 2. In some examples, the rover circuitry 112 obtains location correction data from the example base circuitry 122 through a short message service (SMS) message. In such examples, the rover circuitry 112 subscribes to a correction service (e.g., an application on a communication device) to receive corrections in a correction packet using an SMS message. However, other ways of obtaining the location correction data from the example base circuitry 122 may additionally and/or alternatively be used.

The example cell tower 115 provides communication between the cellular modem on the example rover circuitry 112 and the cellular modem on the example base circuitry 122. Additionally and/or alternatively, the example rover circuitry 112 and the example base circuitry 122 can communicate location correction data via a cloud. However, other ways of communicating over the cellular network between the rover circuitry 112 and the base circuitry 122 may additionally and/or alternatively be used. In some examples, the rover circuitry 112 and the base circuitry 122 can communicate over a local network (e.g., an infield network) that is dedicated to the exchange of RTK corrections.

The example base circuitry 122 of the illustrated example of FIG. 1 determines location correction data for the example satellite 125. The base circuitry 122 receives signals from the satellite 125. The example location request circuitry 230 determines the location data for the base 120 using the received signals from the satellite 125. The base circuitry 122 determines the amount of time it took for the base circuitry 122 to receive a signal from the satellite 125. In some examples, the base circuitry 122 determines the location data of the base 120 based on a calculated distance from the position of the satellite 125 using the amount of time it took to receive the signal. In some examples, the base circuitry 122 compares the calculated location data to the known reference location of the base 120 and calculates an error value based on the comparison. In some examples, the base circuitry 122 provides the error value to the example rover circuitry 112 through the correction stream. In some examples, the base circuitry 122 provides the error value to the rover circuitry 112 through an SMS message using the cell tower 115. An example implementation of the base circuitry 122 is further described in detail below in connection with FIG. 2.

Figure 2:
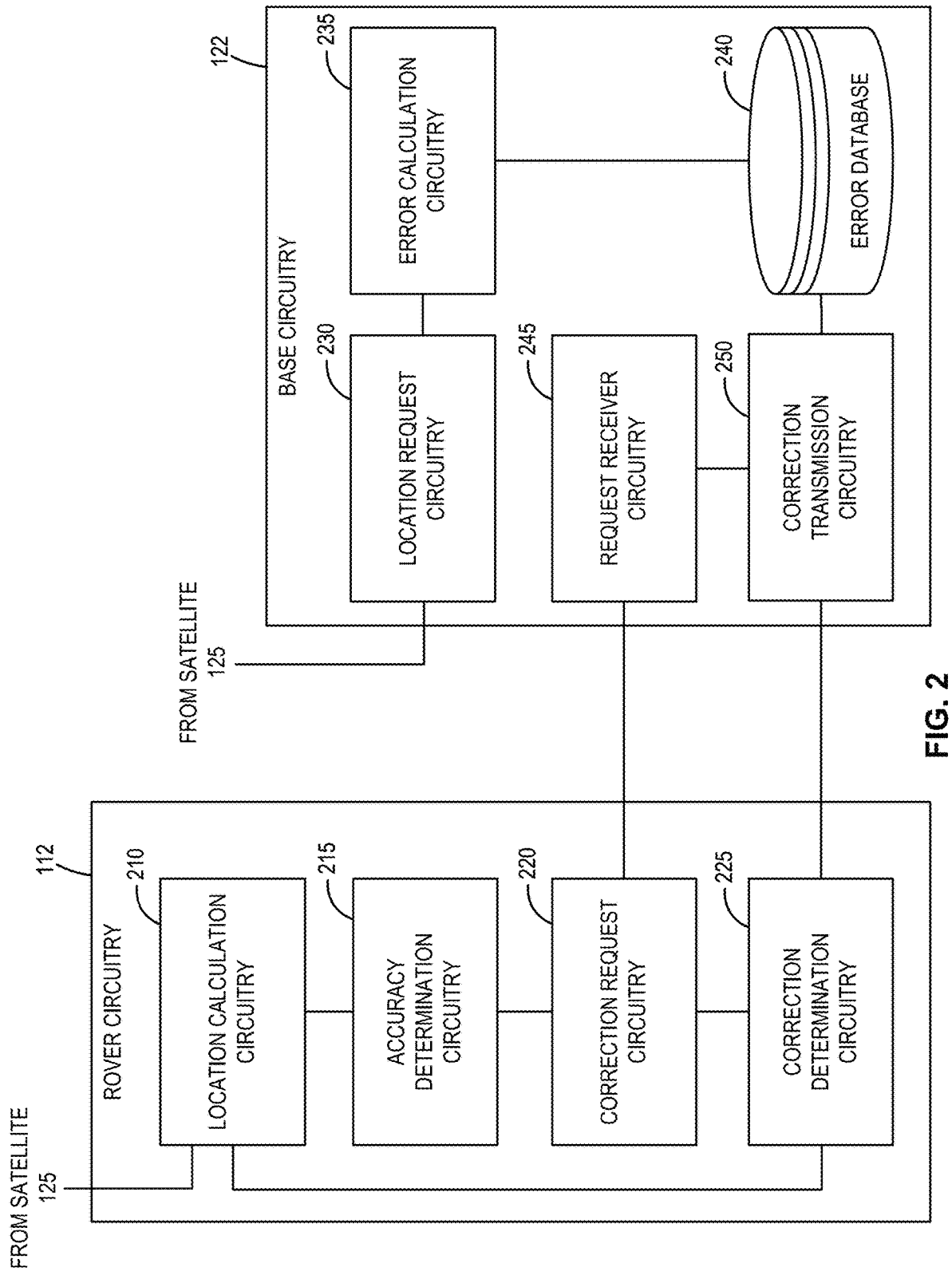
FIG. 2 is a block diagram of example rover circuitry and example base circuitry included in the example environment of FIG. 1.

FIG. 2 is a block diagram of the example rover circuitry 112 and the example base circuitry 122 included in the example environment 100 of FIG. 1. The example rover circuitry 112 includes example location calculation circuitry 210, example accuracy determination circuitry 215, example correction request circuitry 220, and example correction determination circuitry 225. The example base circuitry 122 includes example location request circuitry 230, example error calculation circuitry 235, an example error database 240, example request receiver circuitry 245, and example correction transmission circuitry 250.

The example location calculation circuitry 210 of the illustrated example of FIG. 2 determines the current location data for the rover 110 of FIG. 1. In some examples, the location calculation circuitry 210 receives signals from the satellite 125. The location calculation circuitry 210 determines the amount of time it took for the location calculation circuitry 210 to receive the signal from the satellite 125. The location calculation circuitry 210 calculates the distance between the rover 110 and the satellite 125 using the amount of time it took to receive the signal. In some examples, the location calculation circuitry 210 determines the current location data based on the distance from the satellite 125. In some examples, the location calculation circuitry 210 receives signals from a network of satellites that include the satellite 125. In such examples, the location calculation circuitry 210 determines the current location data based on comparing the distances from the different satellites in the network. In some examples, the location calculation circuitry 210 receives location correction data from the example correction determination circuitry 225, which is discussed in further detail below. In some examples, the location correction data includes calculated error value(s) for the satellite 125 and/or the network of satellites. The location calculation circuitry 210 adjusts the current location data with the received error value(s).

In the illustrated example of FIG. 2, the example accuracy determination circuitry 215 calculates the accuracy of the current location data. In some examples, the accuracy determination circuitry 215 determines an error metric for the current location data. In some examples, a standardized form of determining error can be used to determine the error metric such as, horizontal dilution of precision (HDOP), vertical dilution of precision (VDOP), etc. However, other forms of determining/calculating an error metric for current location data can be additionally and/or alternatively be used. In some examples, the accuracy of the current location data is based on the determined error metric. In some examples, the accuracy determination circuitry 215 calculates the accuracy of adjusted location data from the location calculation circuitry 210. In some examples, the adjusted location data is the current location data adjusted with received error value(s) from the example correction determination circuitry 225. The accuracy determination circuitry 215 determines if the accuracy satisfies a threshold. In some examples, the threshold is application specific (e.g., guidance vs elevation control). In some examples, the threshold is based on the type of field operation that is being done. For example, if the field operation for the device associated with the rover 110 is planting, the threshold may be set to a sub inch difference. In another example, if the field operation for the device is tillage, the threshold may be set to a +/−1 inch difference. However, the threshold may be set to any other value(s) for different field operations. In some examples, the threshold is user configurable (e.g., the user sets the threshold via a user interface). The accuracy determination circuitry 215 compares the error metric of the accuracy to the threshold. In some examples, the accuracy determination circuitry 215 determines that the accuracy does not satisfy the threshold when the error metric is below the threshold.

The example correction request circuitry 220 connects to a correction stream based on the output from the accuracy determination circuitry 215. If the example accuracy determination circuitry 215 determines that the accuracy does not satisfy the threshold, then the example correction request circuitry 220 connects to the correction stream. The example correction request circuitry 220 requests location correction data from the example base circuitry 122 through the correction stream. In some examples, the correction request circuitry 220 includes identification information for the location correction data in the request. In some examples, the identification information includes identifiers associated with a specific satellite (e.g., the satellite 125). However, other identification information may be additionally and/or alternatively included in the request for correction data.

In some examples, the correction request circuitry 220 includes the current location of the rover 110 in the request. For example, the correction request circuitry 220 can request location correction data from a virtual base station that includes correction data from a plurality of bases (e.g., the base 120 of FIG. 1). The virtual base station can aggregate location correction data from neighboring bases included in the plurality of bases. In such examples, the correction request circuitry 220 includes the current location of the rover 110 in the request, and the virtual base station can provide the location correction data from the base(s) (e.g., the base 120) that are near the current location of the rover 110. If the example accuracy determination circuitry 215 determines that the accuracy does satisfy a threshold, then the example correction request circuitry 220 does not connect to the correction stream. In some examples, the correction request circuitry 220 is already connected to the correction stream based on a previous output from the accuracy determination circuitry 215. In such examples, the correction request circuitry 220 determines if the correction request circuitry 220 is already connected to the correction stream. If the accuracy determination circuitry 215 determines that the accuracy does satisfy a threshold and the correction request circuitry 220 determines the correction request circuitry 220 is connected to the correction stream, then the correction request circuitry 220 stops the flow of location correction data (e.g., disconnects) from the correction stream. In some examples, the correction request circuitry 220 requests location correction data from the example base circuitry 122 through a subscription to a correction service. For example, the correction request circuitry 220 includes identification information for the location correction data in a request to the correction service. However, the correction request circuitry 220 can request location correction data in additional and/or alternative ways.

The example correction determination circuitry 225 receives location correction data from the example base circuitry 122 through the cell tower 115. The correction determination circuitry 225 receives the error value(s) included in the location correction data for the satellite 125 and/or a network of satellites. In some examples, the correction determination circuitry 225 receives the location correction data through the correction stream. The correction determination circuitry 225 receives the location correction data when the correction request circuitry 220 is connected to the correction stream. In some examples, the correction determination circuitry 225 receives the location correction data through and SMS message. For example, if the correction request circuitry 220 requests the location correction data through a correction service, the correction service can provide the location correction data in an SMS message sent using the cell tower 115. The correction determination circuitry 225 provides the location correction data to the example location calculation circuitry 210.

In the illustrated example of FIG. 2, the example location request circuitry 230 receives signals from the satellite 125 of FIG. 1. In some examples, the location request circuitry 230 receives signals from a plurality of satellites included in a network of satellites. The example location request circuitry 230 determines the location data for the base circuitry 122 using the received signals from the satellite 125. The location request circuitry 230 determines the amount of time it took for the location request circuitry 230 to receive a signal from the satellite 125. The location request circuitry 230 calculates the distance between the base circuitry 122 and the satellite 125 using the amount of time it took to receive the signal. In some examples, the location request circuitry 230 determines the location data of the base 120 based on the distance from the satellite 125.

The example error calculation circuitry 235 calculates an error value for the satellite 125. The example error calculation circuitry 235 compares the location data determined by the location request circuitry 230 to the known location of the base 120. The error calculation circuitry 235 calculates an error value based on the comparison of the location data from the location request circuitry 230 to the known location. In some examples, the error value is a percent difference calculation between the determined location data and the known location of the base 120. However, other calculations for determining the error value may additionally and/or alternatively be used. The error calculation circuitry 235 stores the error value in the error database 240. In some examples, the error calculation circuitry 235 calculates error values for a plurality of satellites in a network of satellites.

The example error database 240 stores the error value for the satellite 125. In some examples, the error database 240 stores error values for a plurality of satellites included in a network of satellites. The error database 240 is implemented by any memory, storage device, and/or storage disc for storing data such as, for example, flash memory, magnetic media, optical media, solid state memory, hard drive(s), thumb drive(s), etc. Furthermore, the data stored in the error database 240 may be in any data format such as, for example, binary data, comma delimited data, tab delimitated data, structured query language (SQL) structures, etc.

The example request receiver circuitry 245 determines whether the example base circuitry 122 receives a request for correction data. In some examples, the request receiver circuitry 245 receives the request for correction data from the example correction request circuitry 220. In some examples, the request receiver circuitry 245 receives the request through the correction stream in the cellular network of the example cell tower 115. In some examples, the request receiver circuitry 245 receives the request for correction data from a correction service. For example, if the correction request circuitry 220 requests the location correction data through a correction service, the request receiver circuitry 245 receives the request for correction data via the correction service. In some examples, the request receiver circuitry 245 determines the identification information of the request for correction data. In some examples, the identification information includes identifiers associated with a specific satellite (e.g., the satellite 125). However, other identification information may be additionally and/or alternatively included in the request for correction data. The request receiver circuitry 245 provides the identification information of the request to the example correction transmission circuitry 250. In some examples, the request receiver circuitry 245 determines the current location of the rover 110 from the request for correction data. For example, request for correction data can include a request for location correction data from a virtual base station that includes correction data from a plurality of bases (e.g., the base 120 of FIG. 1). In such examples, the request receiver circuitry 245 provides the request for correction data to the virtual base station, where the virtual base station can provide the location correction data from the base(s) (e.g., the base 120) that are near the current location of the rover 110.

The example correction transmission circuitry 250 receives the request for correction data from the request receiver circuitry 245. In some examples, the correction transmission circuitry 250 receives the identification information of the request for correction data. If the example request receiver circuitry 245 determines that the base circuitry 122 receives a request for correction data, then the correction transmission circuitry 250 identifies the requested error value(s) in the error database 240 associated with the identification information included in the request for correction data. The correction transmission circuitry 250 transmits the requested error value(s) from the error database 240 to the example correction determination circuitry 225. In some examples, the correction transmission circuitry 250 transmits the requested error value(s) in a correction stream through the cellular network of the example cell tower 115. In some examples, the correction transmission circuitry 250 transmits the requested error value(s) to the correction service, where the correction service provides the requested error value(s) in a short message service (SMS) message.

In some examples, the rover circuitry 112 includes means for calculating location. For example, the means for calculating location may be implemented by the location calculation circuitry 210. In some examples, the location calculation circuitry 210 may be instantiated by processor circuitry such as the example processor circuitry 512 of FIG. 5. For instance, the location calculation circuitry 210 may be instantiated by the example microprocessor 700 of FIG. 7 executing machine executable instructions such as those implemented by at least blocks 305, 335 of FIG. 3. In some examples, the location calculation circuitry 210 may be instantiated by hardware logic circuitry, which may be implemented by an ASIC, XPU, or the FPGA circuitry 800 of FIG. 8 structured to perform operations corresponding to the machine readable instructions. Additionally or alternatively, the location calculation circuitry 210 may be instantiated by any other combination of hardware, software, and/or firmware. For example, the location calculation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the rover circuitry 112 includes means for determining accuracy. For example, the means for determining accuracy may be implemented by the accuracy determination circuitry 215. In some examples, the accuracy determination circuitry 215 may be instantiated by processor circuitry such as the example processor circuitry 512 of FIG. 5. For instance, the accuracy determination circuitry 215 may be instantiated by the example microprocessor 700 of FIG. 7 executing machine executable instructions such as those implemented by at least blocks 310, 315 of FIG. 3. In some examples, the accuracy determination circuitry 215 may be instantiated by hardware logic circuitry, which may be implemented by an ASIC, XPU, or the FPGA circuitry 800 of FIG. 8 structured to perform operations corresponding to the machine readable instructions. Additionally or alternatively, the accuracy determination circuitry 215 may be instantiated by any other combination of hardware, software, and/or firmware. For example, the accuracy determination circuitry 215 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the rover circuitry 112 includes means for requesting corrections. For example, the means for requesting corrections may be implemented by the correction request circuitry 220. In some examples, the correction request circuitry 220 may be instantiated by processor circuitry such as the example processor circuitry 512 of FIG. 5. For instance, the correction request circuitry 220 may be instantiated by the example microprocessor 700 of FIG. 7 executing machine executable instructions such as those implemented by at least blocks 320, 325, 340, 345 of FIG. 3. In some examples, the correction request circuitry 220 may be instantiated by hardware logic circuitry, which may be implemented by an ASIC, XPU, or the FPGA circuitry 800 of FIG. 8 structured to perform operations corresponding to the machine readable instructions. Additionally or alternatively, the correction request circuitry 220 may be instantiated by any other combination of hardware, software, and/or firmware. For example, the correction request circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the rover circuitry 112 includes means for determining corrections. For example, the means for determining corrections may be implemented by the correction determination circuitry 225. In some examples, the correction determination circuitry 225 may be instantiated by processor circuitry such as the example processor circuitry 512 of FIG. 5. For instance, the correction determination circuitry 225 may be instantiated by the example microprocessor 700 of FIG. 7 executing machine executable instructions such as those implemented by at least block 330 of FIG. 3. In some examples, the correction determination circuitry 225 may be instantiated by hardware logic circuitry, which may be implemented by an ASIC, XPU, or the FPGA circuitry 800 of FIG. 8 structured to perform operations corresponding to the machine readable instructions. Additionally or alternatively, the correction determination circuitry 225 may be instantiated by any other combination of hardware, software, and/or firmware. For example, the correction determination circuitry 225 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the base circuitry 122 includes means for requesting location. For example, the means for requesting location may be implemented by the location request circuitry 230. In some examples, the location request circuitry 230 may be instantiated by processor circuitry such as the example processor circuitry 612 of FIG. 6. For instance, the location request circuitry 230 may be instantiated by the example microprocessor 700 of FIG. 7 executing machine executable instructions such as those implemented by at least block 405 of FIG. 4. In some examples, the location request circuitry 230 may be instantiated by hardware logic circuitry, which may be implemented by an ASIC, XPU, or the FPGA circuitry 800 of FIG. 8 structured to perform operations corresponding to the machine readable instructions. Additionally or alternatively, the location request circuitry 230 may be instantiated by any other combination of hardware, software, and/or firmware. For example, the location request circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the base circuitry 122 includes means for calculating error. For example, the means for calculating error may be implemented by the error calculation circuitry 235. In some examples, the error calculation circuitry 235 may be instantiated by processor circuitry such as the example processor circuitry 612 of FIG. 6. For instance, the error calculation circuitry 235 may be instantiated by the example microprocessor 700 of FIG. 7 executing machine executable instructions such as those implemented by at least blocks 410, 415, 420 of FIG. 4. In some examples, the error calculation circuitry 235 may be instantiated by hardware logic circuitry, which may be implemented by an ASIC, XPU, or the FPGA circuitry 800 of FIG. 8 structured to perform operations corresponding to the machine readable instructions. Additionally or alternatively, the error calculation circuitry 235 may be instantiated by any other combination of hardware, software, and/or firmware. For example, the error calculation circuitry 235 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the base circuitry 122 includes means for receiving requests. For example, the means for receiving requests may be implemented by the request receiver circuitry 245. In some examples, the request receiver circuitry 245 may be instantiated by processor circuitry such as the example processor circuitry 612 of FIG. 6. For instance, the request receiver circuitry 245 may be instantiated by the example microprocessor 700 of FIG. 7 executing machine executable instructions such as those implemented by at least block 425 of FIG. 4. In some examples, the request receiver circuitry 245 may be instantiated by hardware logic circuitry, which may be implemented by an ASIC, XPU, or the FPGA circuitry 800 of FIG. 8 structured to perform operations corresponding to the machine readable instructions. Additionally or alternatively, the request receiver circuitry 245 may be instantiated by any other combination of hardware, software, and/or firmware. For example, the request receiver circuitry 245 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the base circuitry 122 includes means for transmitting corrections. For example, the means for transmitting corrections may be implemented by the correction transmission circuitry 250. In some examples, the correction transmission circuitry 250 may be instantiated by processor circuitry such as the example processor circuitry 612 of FIG. 6. For instance, the correction transmission circuitry 250 may be instantiated by the example microprocessor 700 of FIG. 7 executing machine executable instructions such as those implemented by at least block 430 of FIG. 4. In some examples, the correction transmission circuitry 250 may be instantiated by hardware logic circuitry, which may be implemented by an ASIC, XPU, or the FPGA circuitry 800 of FIG. 8 structured to perform operations corresponding to the machine readable instructions. Additionally or alternatively, the correction transmission circuitry 250 may be instantiated by any other combination of hardware, software, and/or firmware. For example, the correction transmission circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the rover circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example location calculation circuitry 210, the example accuracy determination circuitry 215, the example correction request circuitry 220, the example correction determination circuitry 225, and/or, more generally, the example rover circuitry 112 of FIG. 1, may be implemented by hardware alone or by hardware in combination with software and/or firmware. Thus, for example, any of the example location calculation circuitry 210, the example accuracy determination circuitry 215, the example correction request circuitry 220, the example correction determination circuitry 225, and/or, more generally, the example rover circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example rover circuitry 112 of FIG. 1 may include one or more elements, processes, and/or devices in addition to, or instead of, those illustrated in FIG. 2, and/or may include more than one of any or all of the illustrated elements, processes and devices.

Figure 3:
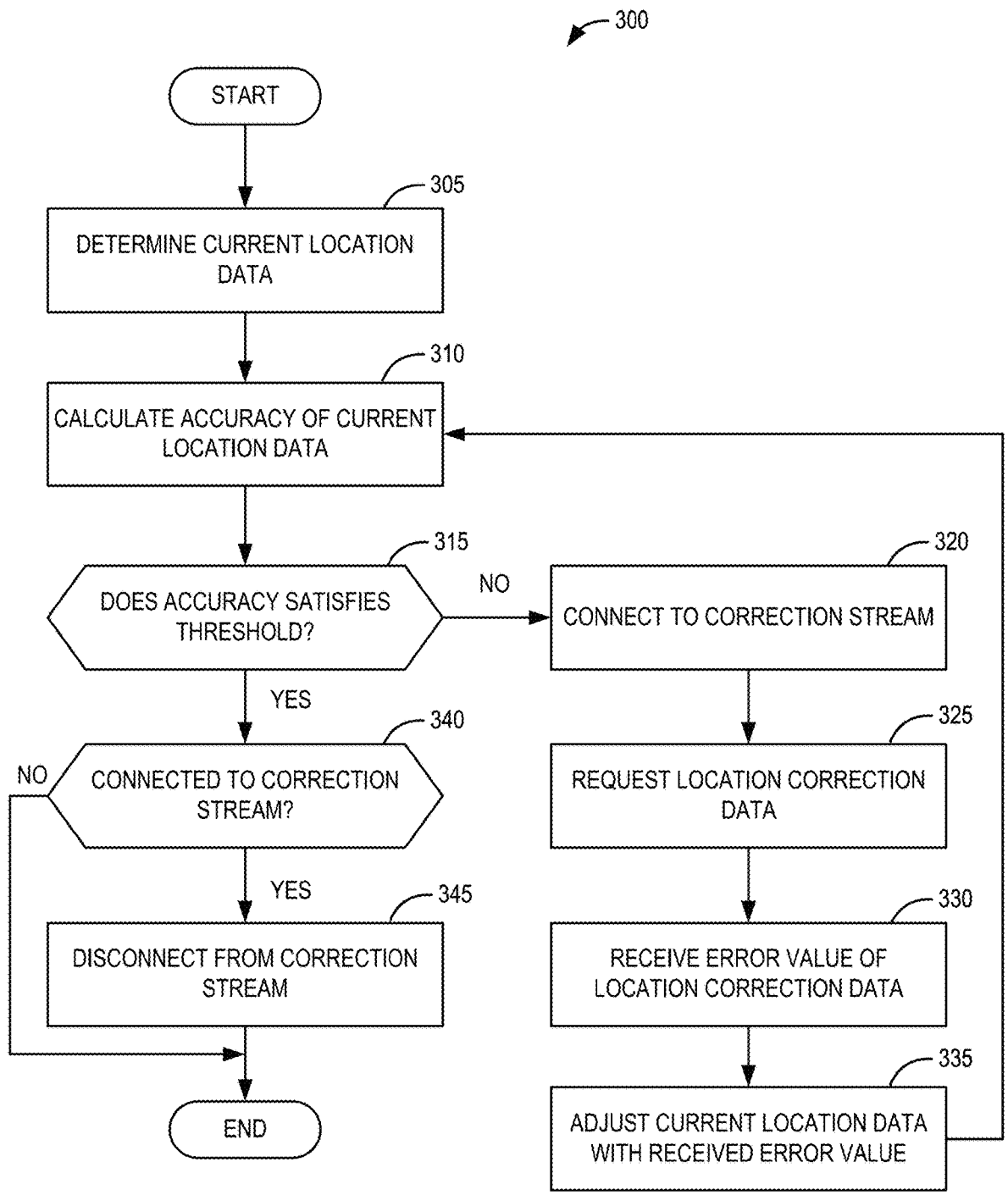
FIG. 3 is a flowchart representative of machine readable instructions which may be executed to implement the example rover circuitry of FIGS. 1 and/or 2.

A flowchart representative of example machine readable instructions, which may be executed to configure processor circuitry to implement the rover circuitry 112 of FIG. 2, is shown in FIG. 3. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example rover circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

While an example manner of implementing the base circuitry 122 of FIG. 1 is illustrated in FIG. 2, one or more of the elements, processes, and/or devices illustrated in FIG. 2 may be combined, divided, re-arranged, omitted, eliminated, and/or implemented in any other way. Further, the example location request circuitry 230, the example error calculation circuitry 235, the example error database 240, the example request receiver circuitry 245, the example correction transmission circuitry 250, and/or, more generally, the example base circuitry 122 of FIG. 1, may be implemented by hardware alone or by hardware in combination with software and/or firmware. Thus, for example, any of the example the example location request circuitry 230, the example error calculation circuitry 235, the example error database 240, the example request receiver circuitry 245, the example correction transmission circuitry 250, and/or, more generally, the example base circuitry 122, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example base circuitry 122 of FIG. 1 may include one or more elements, processes, and/or devices in addition to, or instead of, those illustrated in FIG. 2, and/or may include more than one of any or all of the illustrated elements, processes and devices.

Figure 4:
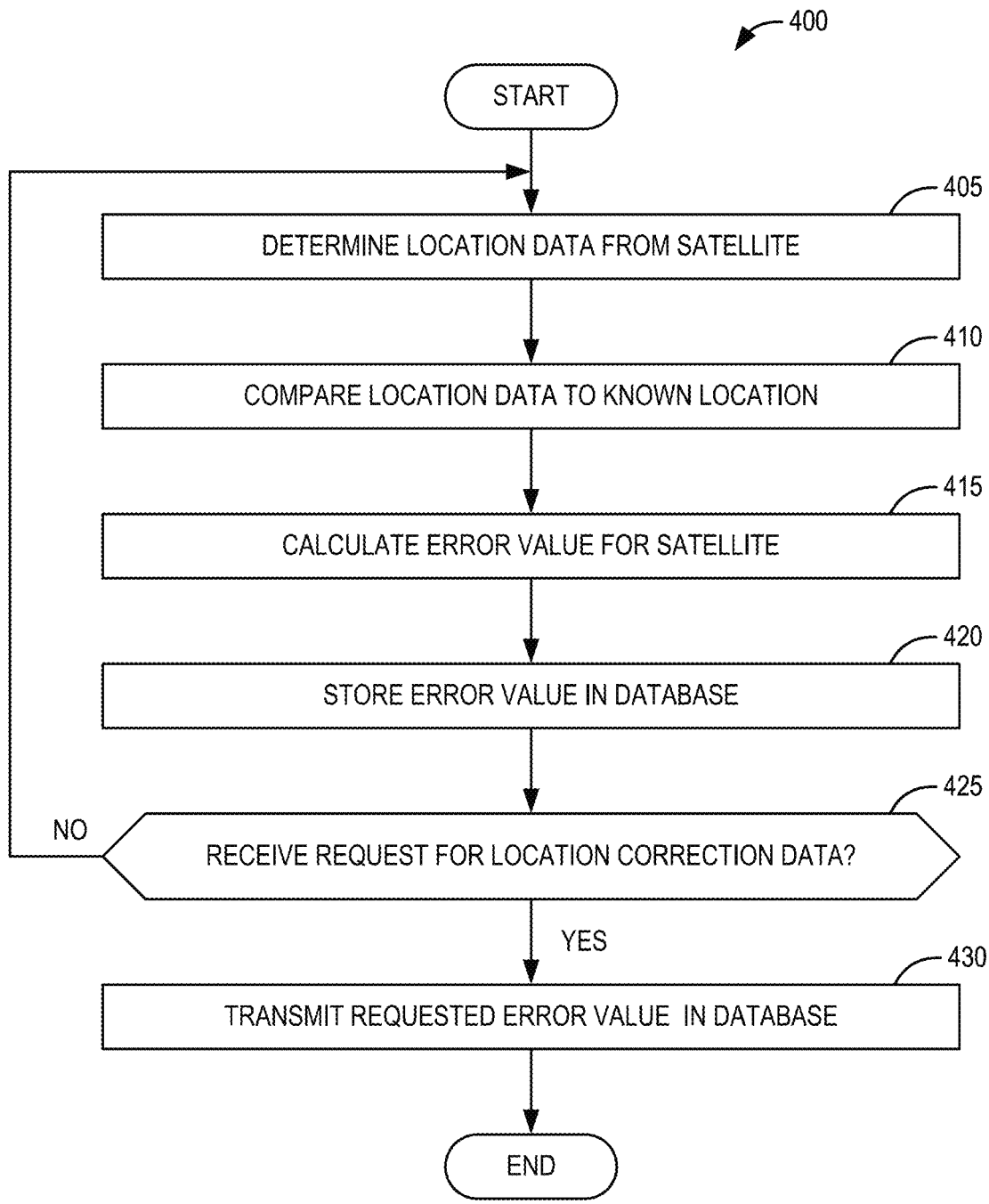
FIG. 4 is a flowchart representative of machine readable instructions which may be executed to implement the example base circuitry of FIGS. 1 and/or 2.

A flowchart representative of example machine readable instructions, which may be executed to configure processor circuitry to implement the base circuitry 122 of FIG. 2, is shown in FIG. 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example base circuitry 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3 and/or 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the example rover circuitry 112 of FIGS. 1 and/or 2. The machine readable instructions and/or the operations 300 of FIG. 3 begin at block 305, at which the example location calculation circuitry 210 of FIG. 2 determines the current location data for the example rover 110 of FIG. 1. In some examples, the location calculation circuitry 210 receives signals from the satellite 125. The location calculation circuitry 210 determines the amount of time it took for the location calculation circuitry 210 to receive the signal from the satellite 125. The location calculation circuitry 210 calculates the distance between the rover 110 and the satellite 125 using the amount of time it took to receive the signal. In some examples, the location calculation circuitry 210 determines the current location data based on the distance from the satellite 125. In some examples, the location calculation circuitry 210 receives signals from a network of satellites that include the satellite 125. In such examples, the location calculation circuitry 210 determines the current location data based on comparing the distances from the different satellites in the network.

At block 310, the example accuracy determination circuitry 215 of FIG. 2 calculates the accuracy of current location data. In some examples, the accuracy determination circuitry 215 determines an error metric for the current location data. In some examples, the accuracy of the current location data is based on the determined error metric. In some examples, the error metric can include a distance measurement between the current location data and the actual location of the rover circuitry 112, a percent difference between the current location data and the actual location of the rover circuitry 112, etc. In some examples, the accuracy determination circuitry 215 calculates the accuracy of adjusted location data from the location calculation circuitry 210. In some examples, the adjusted location data is the current location data adjusted with received error value(s) from the example correction determination circuitry 225.

At block 315, the example accuracy determination circuitry 215 of FIG. 2 determines if the accuracy satisfies a threshold. In some examples, the threshold is application specific (e.g., guidance v. elevation control). In some examples, the threshold is based on the type of field operation that is being performed. For example, if the field operation for the device associated with the rover is planting, the threshold may be set to a sub inch difference, and if the field operation for the device is tillage, the threshold may be set to a +/−1 inch difference. However, the threshold may be set to any other value for different field operations. In some examples, the threshold is user configurable (e.g., the user sets the threshold via a user interface). The accuracy determination circuitry 215 compares the error metric of the accuracy to the threshold. If the example accuracy determination circuitry 215 determines that the accuracy does not satisfy the threshold, then the operations 300 continue to block 320 at which the example correction request circuitry 220 connects to a correction stream. If the example accuracy determination circuitry 215 determines that the accuracy does satisfy a threshold, then the operations 300 continue to block 340 at which the example correction request circuitry 220 determines if the example correction request circuitry 220 is connected to the correction stream.

At block 320, the example correction request circuitry 220 of FIG. 2 connects to a correction stream. In some examples, the correction request circuitry 220 connects to the correction stream through the cellular network of the example cell tower 115.

At block 325, the example correction request circuitry 220 requests correction data. The example correction request circuitry 220 requests location correction data from the example base circuitry 122 through the correction stream. In some examples, the correction request circuitry 220 includes identification information for the location correction data in the request. In some examples, the identification information includes identifiers associated with a specific satellite (e.g., the satellite 125). However, other identification information may be additionally and/or alternatively included in the request for correction data. In some examples, the correction request circuitry 220 includes the current location of the rover circuitry 112 in the request. For example, the correction request circuitry 220 can request location correction data from a virtual base station that includes correction data from a plurality of bases (e.g., base circuitry 122). The virtual base station can aggregate location correction data from neighboring bases included in the plurality of bases. In such examples, the correction request circuitry 220 includes the current location of the rover circuitry 112 in the request, and the virtual base station can provide the location correction data from the base(s) (e.g., base circuitry 122) that are near the current location of the rover circuitry 112. In some examples, the correction request circuitry 220 requests location correction data from the example base circuitry 122 through a subscription to a correction service. For example, the correction request circuitry 220 includes identification information for the location correction data in a request to the correction service. However, the correction request circuitry 220 can request location correction data in additional and/or alternative ways.

At block 330, the example correction determination circuitry 225 of FIG. 2 receives an error value of the location correction data. The correction determination circuitry 225 receives location correction data from the correction transmission circuitry 250 of the base circuitry 122. The correction determination circuitry 225 receives the error value included in the location correction data for the satellite 125. In some examples, the correction determination circuitry 225 receives the location correction data through the correction stream. In some examples, the correction determination circuitry 225 receives location correction data from a virtual base station that includes correction data from the base circuitry 122 (e.g., from the correction transmission circuitry 250). In some examples, the correction determination circuitry 225 receives the location correction data through an SMS message. For example, if the correction request circuitry 220 requests the location correction data through a correction service, the correction service can provide the location correction data in an SMS message sent using the cell tower 115. The correction determination circuitry 225 provides the location correction data to the example location calculation circuitry 210.

At block 335, the example location calculation circuitry 210 of FIG. 2 adjusts the current location data with the received error value for the example satellite 125. The location calculation circuitry 210 adjusts the current location data with the received error value. Once the location calculation circuitry 210 adjusted the current location data with the received error value, the example operations 300 return to block 310 at which the example accuracy determination circuitry 215 calculates the accuracy of the adjusted current location data.

At block 340, the example correction request circuitry 220 of FIG. 2 determines if the correction request circuitry 220 is connected to the correction stream. In some examples, the correction request circuitry 220 is already connected to the correction stream based on a previous output from the accuracy determination circuitry 215. In such examples, the correction request circuitry 220 determines if the correction request circuitry 220 is already connected to the correction stream. If the example correction request circuitry 220 determines that the correction request circuitry 220 is connected to the correction stream, then process 300 continues to block 345 at which the correction request circuitry 220 disconnects from the correction stream. If the example correction request circuitry 220 determines that the correction request circuitry 220 is not connected to the correction stream, then the operations 300 end.

At block 345, the example correction request circuitry 220 of FIG. 2 disconnects from the correction stream. In some examples, the correction request circuitry 220 keeps the connection to the correction stream but stops the flow of location correction data from the correction stream. Once the correction request circuitry 220 disconnects from the correction stream, the operations 300 end.

FIG. 4 is a flowchart representative of example machine readable instructions and/or example operations 400 that may be executed and/or instantiated by processor circuitry to implement the example base circuitry 122 of FIGS. 1 and/or 2. The machine readable instructions and/or the operations 400 of FIG. 4 begin at block 405, at which the example location request circuitry 230 of FIG. 2 determines the location data from the satellite 125 of FIG. 1. In some examples, the location request circuitry 230 receives signals from the satellite 125 of FIG. 1. In some examples, the location request circuitry 230 receives signals from a plurality of satellites included in a network of satellites. The example location request circuitry 230 determines the location data for the base circuitry 122 using the received signals from the satellite 125. The location request circuitry 230 determines the amount of time it took for the location request circuitry 230 to receive a signal from the satellite 125. The location request circuitry 230 calculates the distance between the base 120 of FIG. 1 and the satellite 125 using the amount of time it took to receive the signal. In some examples, the location request circuitry 230 determines the location data of the base 120 based on the distance from the satellite 125.

At block 410, the example error calculation circuitry 235 of FIG. 2 compares the location data to a known location. The example error calculation circuitry 235 compares the location data determined by the location request circuitry 230 to the known location of the base 120.

At block 415, the example error calculation circuitry 235 of FIG. 2 calculates an error value for the satellite 125. The error calculation circuitry 235 calculates the error value based on the comparison of the location data from the location request circuitry 230 to the known location. In some examples, the error value is percent difference calculation between the determined location data and the known location of the base 120. However, other calculations for determining the error value may additionally and/or alternatively be used.

At block 420, the example error calculation circuitry 235 of FIG. 2 stores the error value in the error database 240.

At block 425, the example request receiver circuitry 245 of FIG. 2 determines whether the example base circuitry 122 receives a request for correction data. In some examples, the request receiver circuitry 245 receives the request for correction data from the example correction request circuitry 220. In some examples, the request receiver circuitry 245 receives the request through the correction stream in the cellular network of the example cell tower 115. In some examples, the request receiver circuitry 245 receives the request for correction data from a correction service. For example, if the correction request circuitry 220 requests the location correction data through a correction service, the request receiver circuitry 245 receives the request for correction data via the correction service. In some examples, the request receiver circuitry 245 determines the identification information of the request for correction data. In some examples, the identification information includes identifiers associated with a specific satellite (e.g., the satellite 125). However, other identification information may be additionally and/or alternatively included in the request for correction data. In some examples, the request receiver circuitry 245 determines the current location of the rover circuitry 112 from the request for correction data. For example, request for correction data can include a request for location correction data from a virtual base station that includes correction data from a plurality of bases (e.g., the base 120). In such examples, the request receiver circuitry 245 provides the request for correction data to the virtual base station, where the virtual base station can provide the location correction data from the base(s) (e.g., the base 120) that are near the current location of the rover 110. If the example request receiver circuitry 245 determines that the base circuitry 122 receives a request for correction data, then the operations 400 continue to block 430 at which the correction transmission circuitry 250 of FIG. 2 transmits the requested error value in the error database 240. If the example request receiver circuitry 245 determines that the base circuitry 122 did not receive a request for correction data, then the operations 400 sit idle until the example location request circuitry 230 of FIG. 2 receives location data from the satellite 125.

At block 430, the example correction transmission circuitry 250 of FIG. 2 transmits a requested error value in the error database 240. The correction transmission circuitry 250 receives the request for correction data from the request receiver circuitry 245. In some examples, the correction transmission circuitry 250 receives the identification information of the request for correction data. If the example request receiver circuitry 245 determines that the base circuitry 122 receives a request for correction data, then the correction transmission circuitry 250 identifies the requested error value(s) in the error database 240 associated with the identification information included in the request for correction data. The correction transmission circuitry 250 transmits the requested error value(s) from the error database 240 to the example correction determination circuitry 225. In some examples, the correction transmission circuitry 250 transmits the requested error value(s) in a correction stream through the cellular network of the example cell tower 115. In some examples, the correction transmission circuitry 250 transmits the requested error value(s) to a correction service, where the correction service provides the requested error value(s) in a short message service (SMS) message to the rover circuitry 112. Once the example correction transmission circuitry 250 transmits the requested error value, the operations 400 end.

Figure 5:
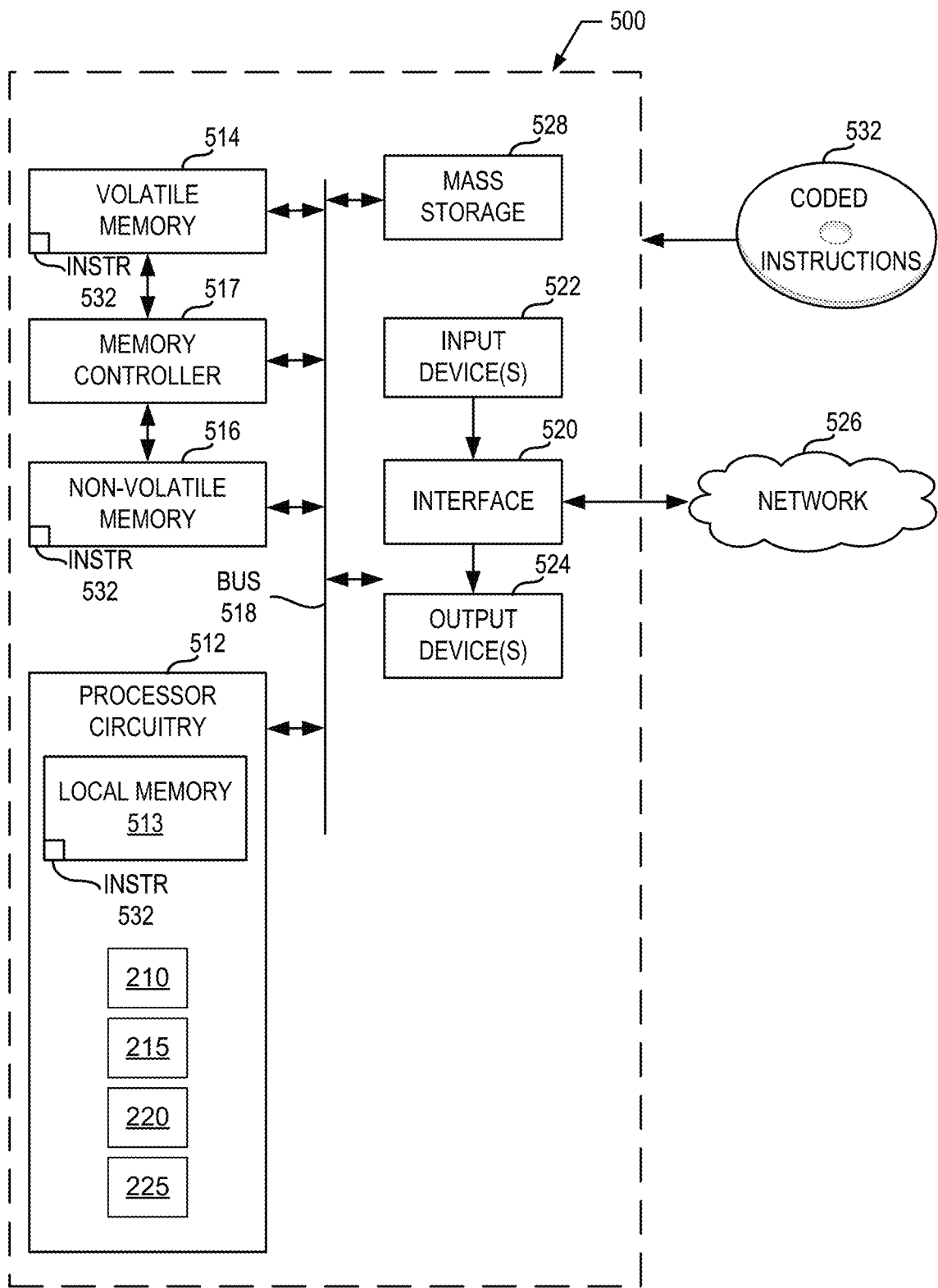
FIG. 5 is a block diagram of an example processing platform structured to execute the instructions of FIG. 3 to implement the example rover circuitry of FIGS. 1 and/or 2.

FIG. 5 is a block diagram of an example processor platform 500 structured to execute and/or instantiate the machine readable instructions and/or the operations of FIG. 3 to implement the rover circuitry 112 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example location calculation circuitry 210, the example accuracy determination circuitry 215, the example correction request circuitry 220, and the example correction determination circuitry 225.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIG. 3, may be stored in the mass storage device 528, in the volatile memory 514, in the non-volatile memory 516, and/or on a removable non-transitory computer readable storage medium such as a CD or DVD.

Figure 6:
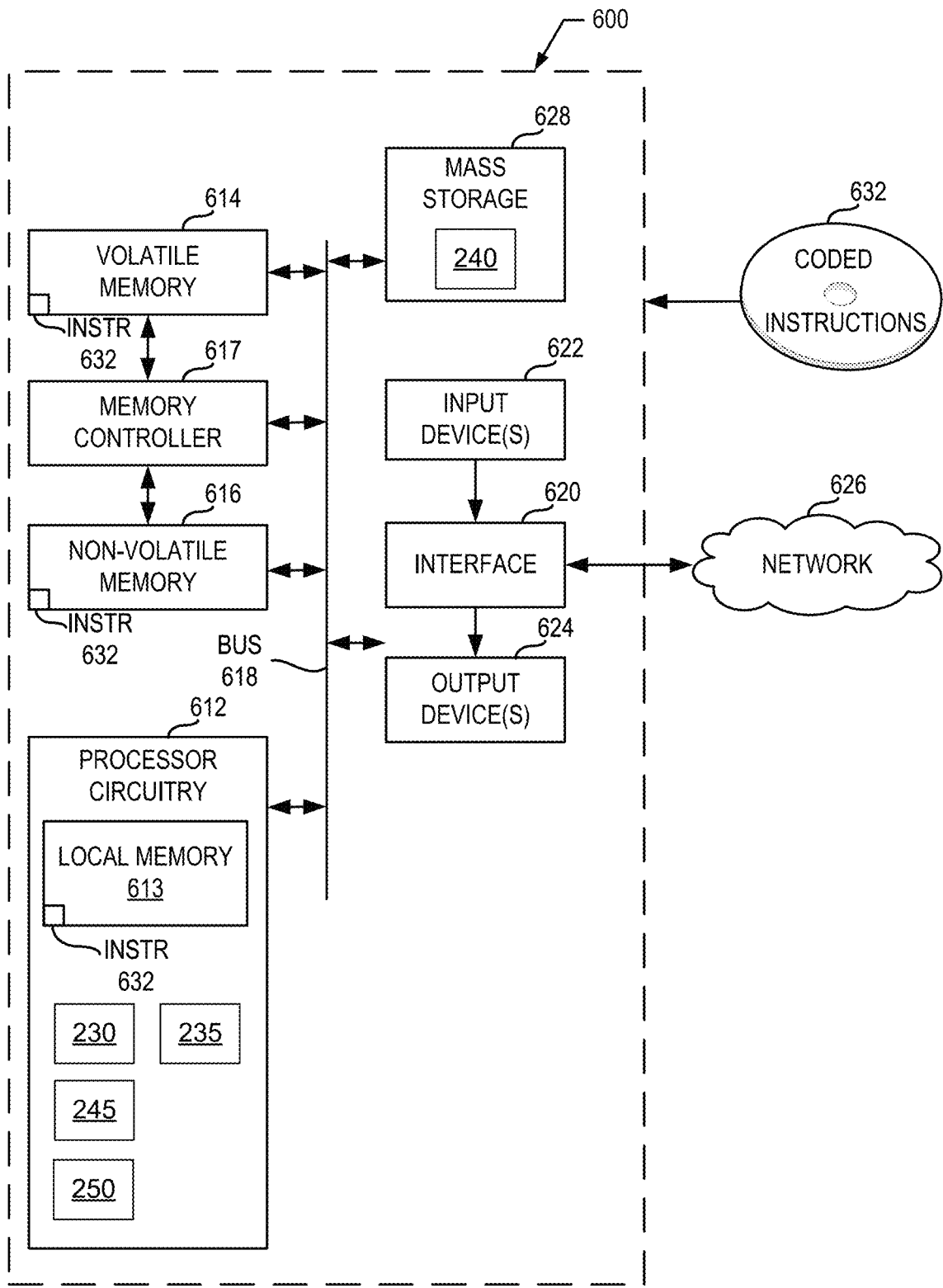
FIG. 6 is a block diagram of an example processing platform structured to execute the instructions of FIG. 3 to implement the example base circuitry of FIGS. 1 and/or 2.

FIG. 6 is a block diagram of an example processor platform 600 structured to execute and/or instantiate the machine readable instructions and/or the operations of FIG. 4 to implement the base circuitry 122 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example location request circuitry 230, the example error calculation circuitry 235, the example error database 240, the example request receiver circuitry 245, and the example correction transmission circuitry 250.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIG. 4, may be stored in the mass storage device 628, in the volatile memory 614, in the non-volatile memory 616, and/or on a removable non-transitory computer readable storage medium such as a CD or DVD.

Figure 7:
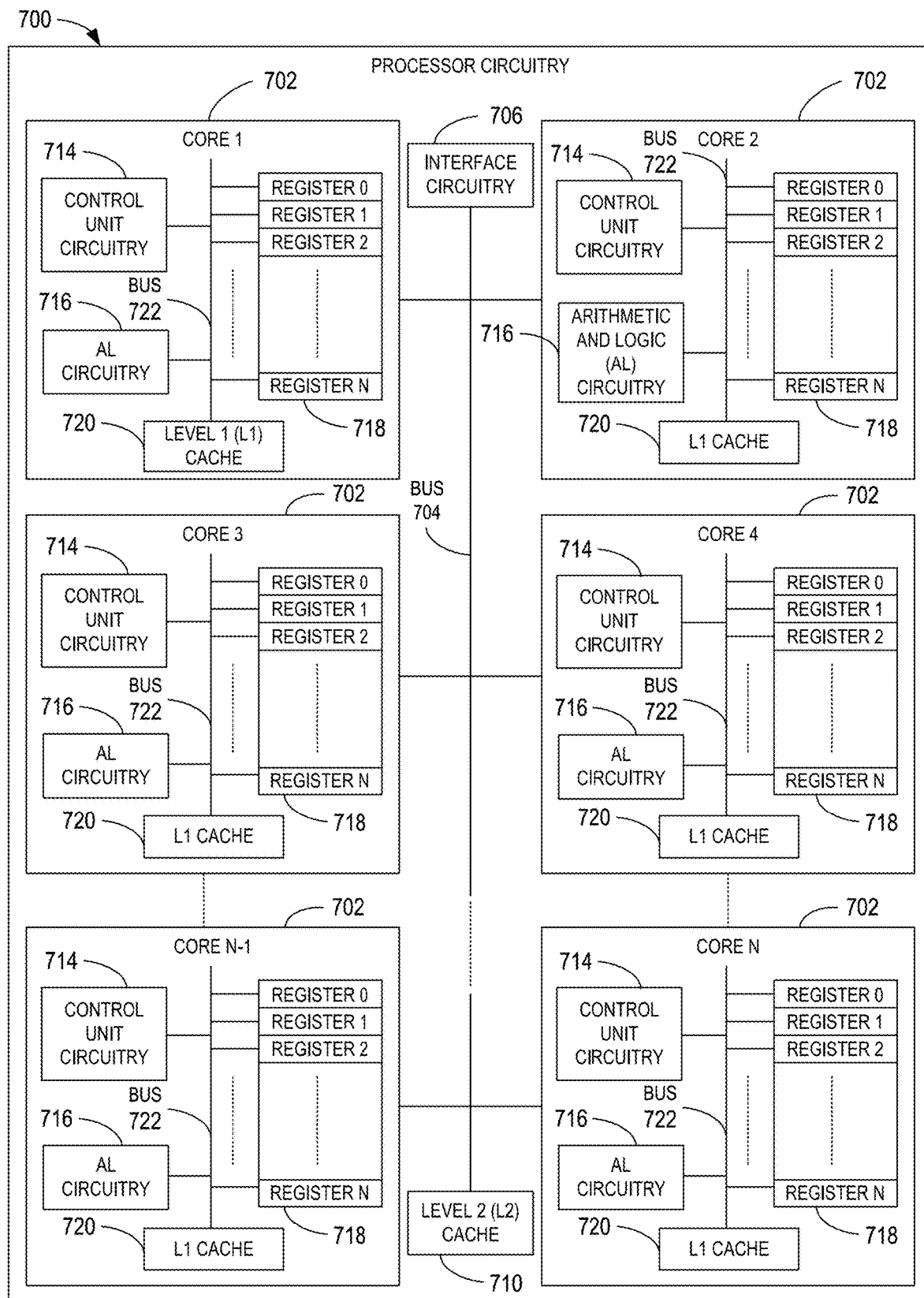
FIG. 7 is a block diagram of an example implementation of the processor circuitry of FIGS. 5 and/or 6.

FIG. 7 is a block diagram of an example implementation of the processor circuitry 512 of FIG. 5 and/or the processor circuitry 612 of FIG. 6. In this example, the processor circuitry 512 of FIG. 5 and/or the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowcharts of FIGS. 3 and/or 4 to effectively instantiate the rover circuitry 112 and/or the base circuitry 122 of FIG. 2 as logic circuits to perform the operations corresponding to those machine readable instructions. In some such examples, the rover circuitry 112 and/or the base circuitry 122 of FIG. 2 is instantiated by the hardy are circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3 and/or 4.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 514, 516 of FIG. 5 and/or the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 5. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
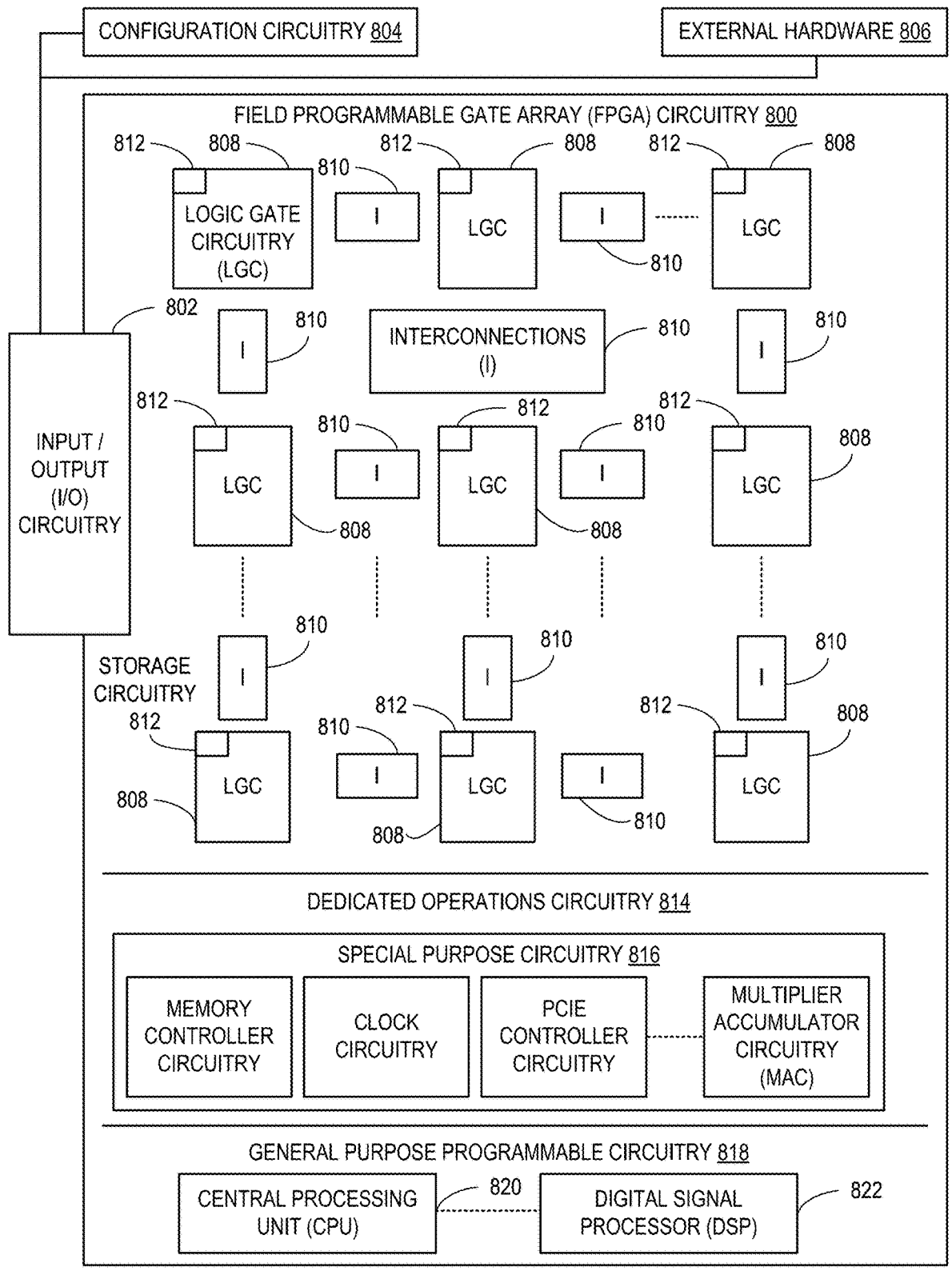
FIG. 8 is a block diagram of another example implementation of the processor circuitry of FIGS. 5 and/or 6.

FIG. 8 is a block diagram of another example implementation of the processor circuitry 512 of FIG. 5 and/or the processor circuitry 612 of FIG. 6. In this example, the processor circuitry 512 of FIG. 5 and/or the processor circuitry 612 of FIG. 6 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3 and/or 4. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3 and/or 4. As such, the FPGA circuitry 800 may be structured to effectively instantiate some or all of the machine readable instructions of the flowcharts of FIGS. 3 and/or 4 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3 and/or 4 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3 and/or 4 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 5 and 6 illustrate two example implementations of the processor circuitry 512 of FIG. 5 and/or the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 512 of FIG. 5 and/or the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3 and/or 4 may be executed by one or more of the cores 702 of FIG. 7, a second portion of the machine readable instructions represented by the flowcharts of FIGS. 3 and/or 4 may be executed by the FPGA circuitry 800 of FIG. 8, and/or a third portion of the machine readable instructions represented by the flowcharts of FIGS. 3 and/or 4 may be executed by an ASIC. It should be understood that some or all of the rover circuitry 112 and/or the base circuitry 122 of FIG. 2 may, thus, be instantiated at the same or different times. Some or all of the circuitry may be instantiated, for example, in one or more threads executing concurrently and/or in series. Moreover, in some examples, some or all of the rover circuitry 112 and/or the base circuitry 122 of FIG. 2 may be implemented within one or more virtual machines and/or containers executing on the microprocessor.

In some examples, the processor circuitry 512 of FIG. 5 and/or the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 512 of FIG. 5 and/or the processor circuitry 612 of FIG. 6, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed manage correction requests in a positioning system. The disclosed methods, apparatus and articles of manufacture improve the efficiency of using a computing device by controlling the amount of corrections sent to a GPS rover by using a set of criteria such as an acceptable error metric to only request RTK corrections from a base when they are needed. The disclosed methods, apparatus and articles of manufacture monitor the inaccuracy of the solution and requests corrections only when it needs them, thus significantly reducing the amount of data that is required to navigate but insuring a minimum level of accuracy. The disclosed methods, apparatus and articles of manufacture are accordingly directed to one or more improvement(s) in the functioning of a computer.

Example methods, apparatus, systems, and articles of manufacture to manage correction requests in a positioning system are disclosed herein. Further examples and combinations thereof include the following:

Example 1 includes an apparatus comprising accuracy determination circuitry to determine accuracy of a current position based on location data, correction request circuitry to request location correction data from a reference location when the accuracy does not satisfy a threshold, and correction determination circuitry to adjust the location data with the location correction.

Example 2 includes the apparatus of example 1, wherein the accuracy determination circuitry is to determine the accuracy of the current position based on the adjusted location data.

Example 3 includes the apparatus of example 1, wherein the correction request circuitry is to connect to a correction stream to request the location correction data, the location correction data including corrections for calculations of the current position based on information from satellites.

Example 4 includes the apparatus of example 3, wherein the correction request circuitry is to stop flow of location correction data from the correction stream after the accuracy satisfies the threshold.

Example 5 includes the apparatus of example 1, wherein the correction request circuitry is to request the location correction data from the reference location using a cellular network or an infield network.

Example 6 includes the apparatus of example 1, wherein the correction determination circuitry is to receive the location correction data from the reference location using at least one short message service (SMS) message.

Example 7 includes a method for correcting location data, the method comprising determining accuracy of a current position based on location data, requesting location correction data from a reference location when the accuracy does not satisfy a threshold, and adjusting the location data with the location correction data.

Example 8 includes the method of example 7, further including determining the accuracy of the current position based on the adjusted location data.

Example 9 includes the method of example 7, further including connecting to a correction stream to request the location correction data, the location correction data including corrections for calculations of the current position based on information from satellites.

Example 10 includes the method of example 9, further including stopping flow of location correction data from the correction stream after the accuracy satisfies the threshold.

Example 11 includes the method of example 7, further including requesting the location correction data from the reference location using a cellular network or an infield network.

Example 12 includes the method of claim 7, further including receiving the location correction data from the reference location using at least one short message service (SMS) message.

Example 13 includes a non-transitory computer readable medium comprising instructions that, when executed, cause processor circuitry to at least determine accuracy of a current position based on location data, request location correction data from a reference location when the accuracy does not satisfy a threshold, and adjust the location data with the location correction data.

Example 14 includes the non-transitory computer readable medium of example 13, wherein the instructions, when executed, cause the processor circuitry to determine the accuracy of the current position based on the adjusted location data.

Example 15 includes the non-transitory computer readable medium of example 13, wherein the instructions, when executed, cause the processor circuitry to connect to a correction stream to request the location correction data, the location correction data including corrections for calculations of the current position based on information from satellites.

Example 16 includes the non-transitory computer readable medium of example 15, wherein the instructions, when executed, cause the processor circuitry to stop flow of location correction data from the correction stream after the accuracy satisfies the threshold.

Example 17 includes the non-transitory computer readable medium of example 13, wherein the instructions, when executed, cause the processor circuitry to request the location correction data from the reference location using a cellular network or an infield network.

Example 18 includes the non-transitory computer readable medium of claim 13, wherein the instructions, when executed, cause the processor circuitry to receive the location correction data from the reference location using at least one short message service (SMS) message.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   at least one processor circuit to be programmed by the machine-readable instructions to:
   determine a first accuracy of a current position based on location data;
   when the first accuracy does not satisfy a threshold, connect to a correction stream from a reference location;
   request location correction data from the reference location via the correction stream;
   adjust the location data based on the location correction data;
   determine a second accuracy of the adjusted location data; and
   when the second accuracy satisfies the threshold, disconnect from the correction stream.

2. The apparatus of claim 1, wherein the current position is a first current position, the at least one processor circuit to determine a second current position based on the adjusted location data.

3. The apparatus of claim 1, wherein the location correction data includes corrections for calculations of the current position based on information from satellites.

4. The apparatus of claim 1, wherein the at least one processor circuit is to request the location correction data from the reference location using a cellular network or an infield network.

5. The apparatus of claim 1, wherein the at least one processor circuit is to receive the location correction data from the reference location using at least one short message service (SMS) message.

6. The apparatus of claim 1, wherein the at least one processor circuit is to transmit a request to the reference location, the request to include an identifier associated with a satellite from which the location data was obtained, the location correction data associated with the satellite.

7. The apparatus of claim 1, wherein the at least one processor circuit is to request the location correction data based on subscription to a correction service.

8. A method for correcting location data, the method comprising:
   determining a first accuracy of a current position based on location data;
   connecting to a correction stream from a reference location based on the first accuracy not satisfying a threshold;
   requesting location correction data from the reference location via the correction stream;
   adjusting the location data based on the location correction data;
   determining a second accuracy of the adjusted location data; and
   disconnecting from the correction stream based on the second accuracy satisfying the threshold.

9. The method of claim 8, wherein the current position is a first current position, further including determining a second current position based on the adjusted location data.

10. The method of claim 8, wherein the location correction data includes corrections for calculations of the current position based on information from satellites.

11. The method of claim 8, further including requesting the location correction data from the reference location using a cellular network or an infield network.

12. The method of claim 8, further including receiving the location correction data from the reference location using at least one short message service (SMS) message.

13. A non-transitory computer readable medium comprising instructions that, when executed, cause processor circuitry to at least:
    determine a first accuracy of a current position based on location data;
    when the first accuracy does not satisfy a threshold, connect to a correction stream from a reference location;
    request location correction data from the reference location via the correction stream;
    adjust the location data based on the location correction data;
    determine a second accuracy of the adjusted location data; and
    when the second accuracy satisfies the threshold, disconnect from the correction stream.

14. The non-transitory computer readable medium of claim 13, wherein the current position is a first current position, and the instructions, when executed, cause the processor circuitry to determine a second current position based on the adjusted location data.

15. The non-transitory computer readable medium of claim 13, wherein the location correction data includes corrections for calculations of the current position based on information from satellites.

16. The non-transitory computer readable medium of claim 13, wherein the instructions, when executed, cause the processor circuitry to request the location correction data from the reference location using a cellular network or an infield network.

17. The non-transitory computer readable medium of claim 13, wherein the instructions, when executed, cause the processor circuitry to receive the location correction data from the reference location using at least one short message service (SMS) message.

* * * * *